United States Patent [19]
Orndorff, Jr.

[11] Patent Number: 5,791,278
[45] Date of Patent: Aug. 11, 1998

[54] FENDER PROTECTIVE STRUCTURE

[75] Inventor: Roy Lee Orndorff, Jr., Kent, Ohio

[73] Assignee: Duramax, Inc., Middlefield, Ohio

[21] Appl. No.: 574,668

[22] Filed: Dec. 19, 1995

[51] Int. Cl.⁶ .................................................. B63B 59/02
[52] U.S. Cl. .................................... 114/219; 267/140
[58] Field of Search .................... 114/45, 47, 219, 114/220; 405/212, 215; 267/141, 140.3, 140.11, 139, 140

[56] References Cited

U.S. PATENT DOCUMENTS

| | | |
|---|---|---|
| 4,104,210 | 8/1978 | Coran et al. . |
| 4,169,680 | 10/1979 | Littlefield .................. 366/139 |
| 4,386,182 | 5/1983 | Zijp . |
| 4,489,033 | 12/1984 | Uda et al. ................ 264/328.7 |
| 4,679,517 | 7/1987 | Kramer . |
| 4,735,982 | 4/1988 | Orndorff, Jr. . |
| 4,909,172 | 3/1990 | Hamby ........................ 114/219 |
| 4,923,550 | 5/1990 | Kramer . |
| 5,095,840 | 3/1992 | Kramer ......................... 114/219 |
| 5,100,947 | 3/1992 | Puydak et al. . |
| 5,570,711 | 11/1996 | Walsh ............................ 138/137 |

OTHER PUBLICATIONS

Japanese Abstract JP62277444, "Rubber Composition", Application Date May 26, 1986, Publication Date Dec. 2, 1987.

Japanese Abstract JP55090735, "Rigid Base Body Covered With Urethane–Elastomer", Application Date Dec. 27, 1978, Publication Date Jul. 9, 1980.

Primary Examiner—Stephen Avila
Attorney, Agent, or Firm—D. Peter Hochberg; Mark Kusner

[57] ABSTRACT

A fender protective structure includes a top layer of ultra high molecular weight polyethylene on a resilient layer comprised of a rubber and plastic alloy. Bore holes are provided in the resilient layer for permitting bulging to facilitate energy absorption when the fender protective structure is impacted by a moving object.

15 Claims, 5 Drawing Sheets

5,791,278

1

FENDER PROTECTIVE STRUCTURE

TECHNICAL FIELD

This invention relates to an impact pad for absorbing forces, and more particularly to an impact pad for absorbing forces having improved energy absorbent materials.

BACKGROUND OF THE INVENTION

In the operation of docking a ship, because of the speed of approach, swells, currents and winds it is imperative to provide a protective docking system to reduce potential damage and impact to the ship, dock or pier. In the case of holding ships, such impact pads are used to protect both the holding ship and the smaller vessel transported therein.

Examples of fender protective structures for these types of applications can be found in commonly owned U.S. Pat. Nos. 4,923,550, 4,596,734, 4,679,517 all of which are issued to Kramer and are hereby fully incorporated herein by reference. The fender protective structures of these systems are comprised of an outer plastic layer of ultra high molecular weight polyethylene (UHMWPE), an intermediate elastomeric layer and a base layer comprised of plastic. The base layer is necessary for installation purposes because a system with a conventional elastomeric layer bonded to a plastic layer is too flexible to work with, particularly when the elastomeric layer is partially counter bored.

Elastomer and plastic alloys are known in the marine art for utilization in the journal bearings that support the propeller shafts. More particularly, the alloy is used as stave material in the journal bearing. An example of such alloys is described in commonly owned U.S. Pat. No. 4,735,982 to Orndorff, Jr. Orndorff Jr. teaches mixing a thermoset rubber compound and a thermoplastic, with the rubber compound having low friction as well as good oil and water resistant properties. Low friction is defined as material which develops hydrodynamic lubrication at normal shaft operating speeds. Use of low friction materials is important in bearing applications because shaft wear must be minimized. For this reason, higher friction rubber compounds are inappropriate in the alloy described in Orndorff, Jr.

Efforts to improve such fender protective systems have led to continuing developments to improve their versatility, practicality and efficiency.

DISCLOSURE OF THE INVENTION

An object of the present invention is to provide a two layer fender protective structure with improved characteristics.

According to the present invention, a fender protective structure includes a top UHMWP layer disposed on a resilient elastomer plastic alloy layer.

The present invention provides a superior material that makes fender protective structures practical, while maintaining optimum resiliency for energy absorption and return and optimum rigidity for ease of installation. The present invention is easy to manufacture, less expensive, and exhibits better quality and reliability than previous systems.

These and other objects, features and advantages of the present invention will become more apparent in the light of the detailed description of exemplary embodiments thereof, as illustrated by the drawings.

2 fenders disposed along the water level under the vessel, with a second vessel being received in the hull of such first vessel.

Figure 1:
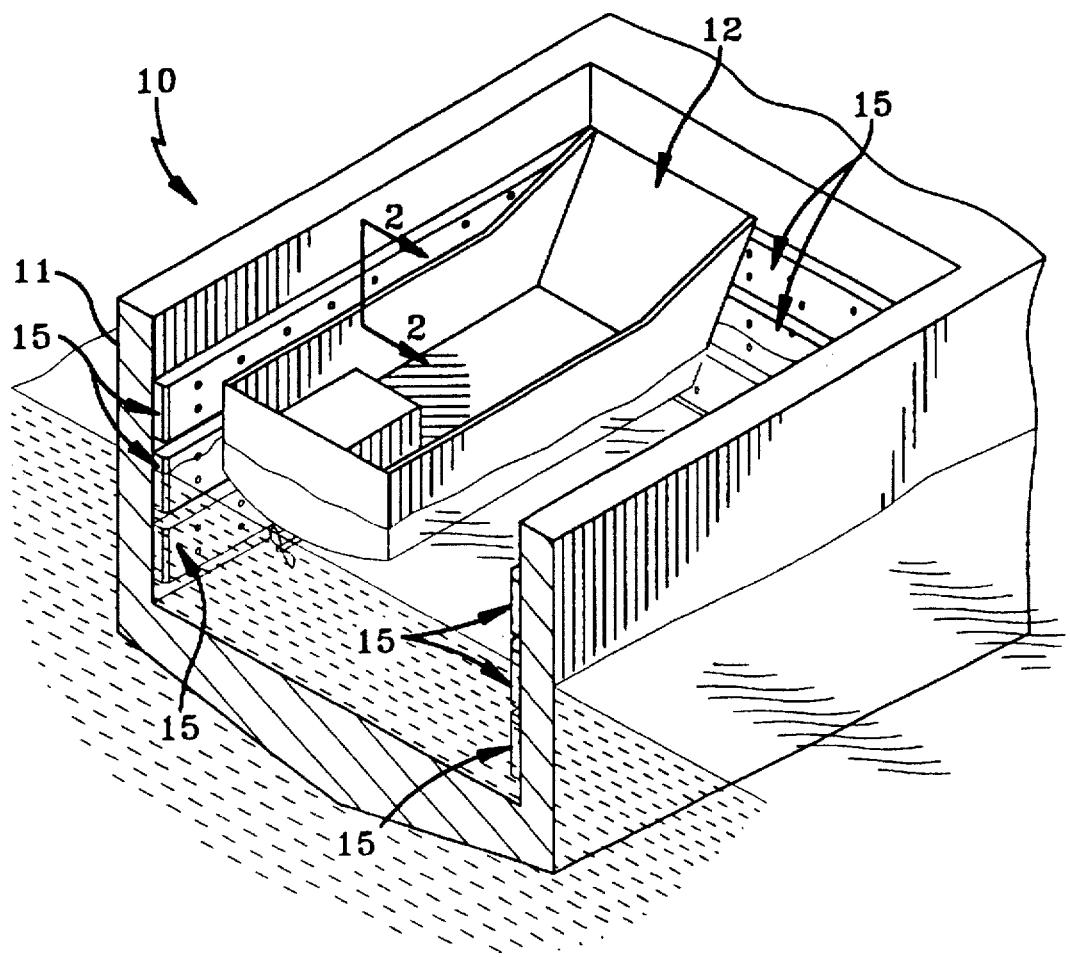
FIG. 1 is a perspective view illustrating the present invention wherein a larger vessel only partly shown, has
Figure 2:
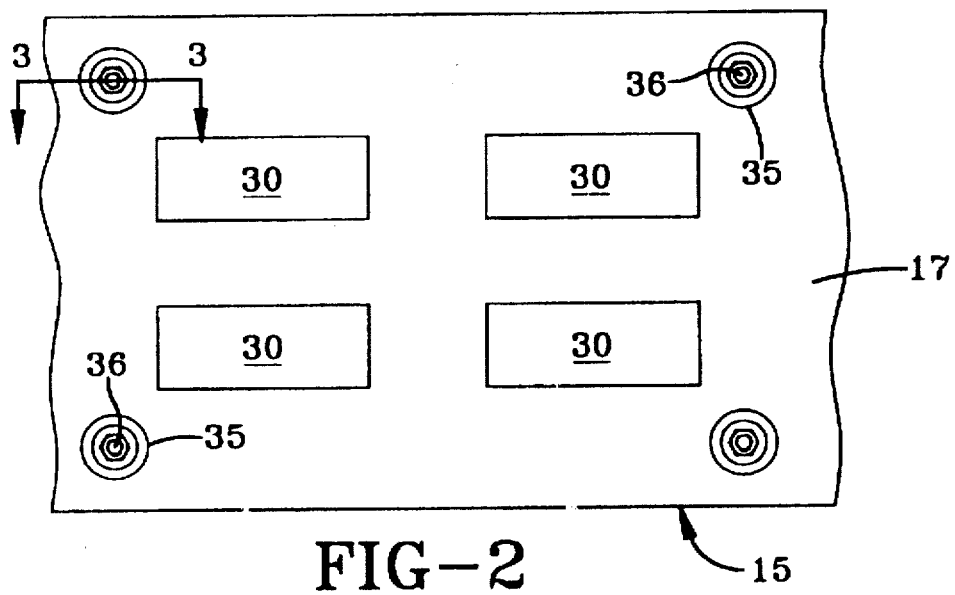

FIG. 2 is a side elevational view of the back side of a fender protective structure in accordance with the present invention, taken on line 2—2 of FIG. 1.

Figure 3:
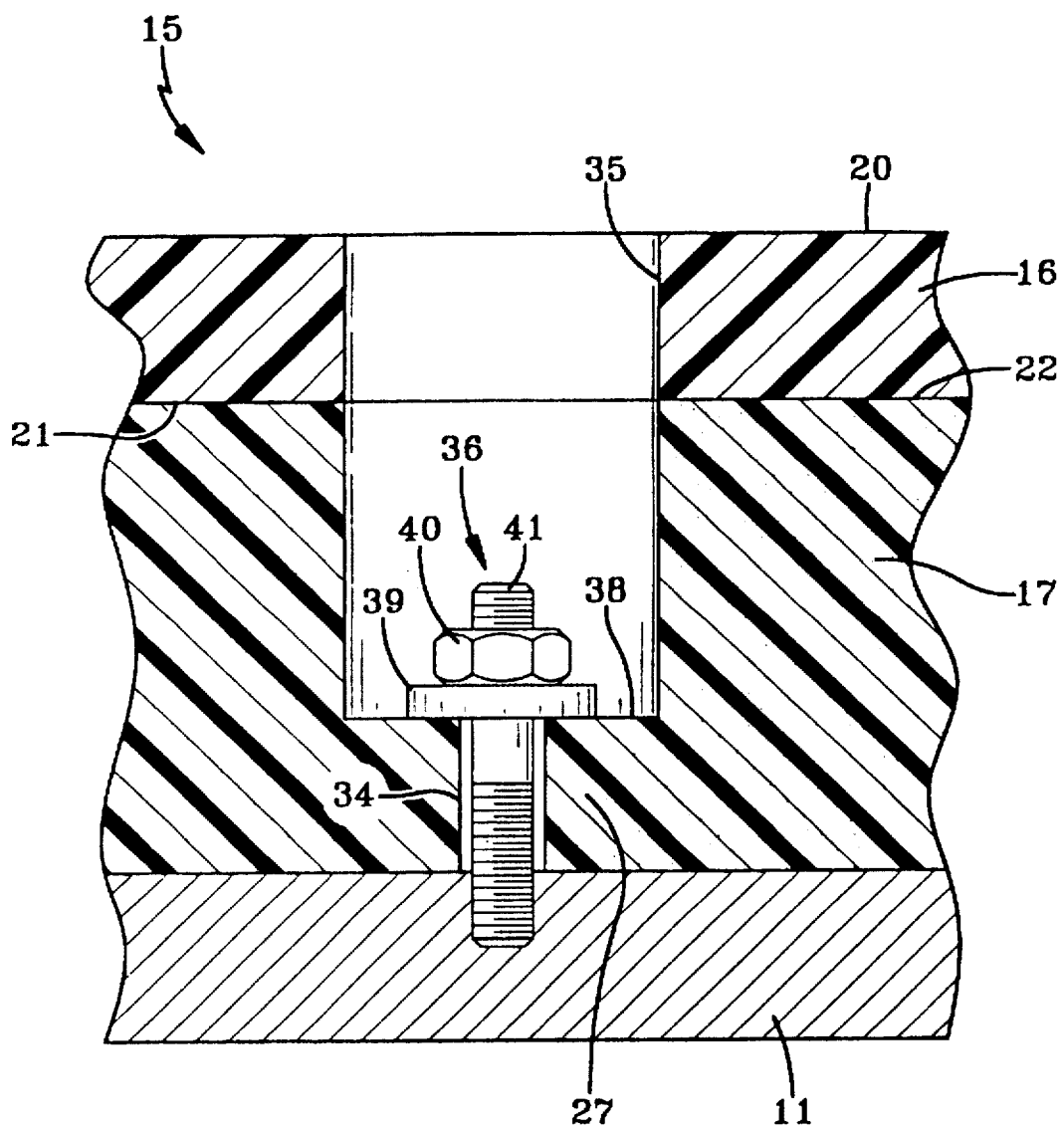

FIG. 3 is a plan view of a fender protective structure taken in cross section on line 3—3 of FIG. 2.

Figure 4A:
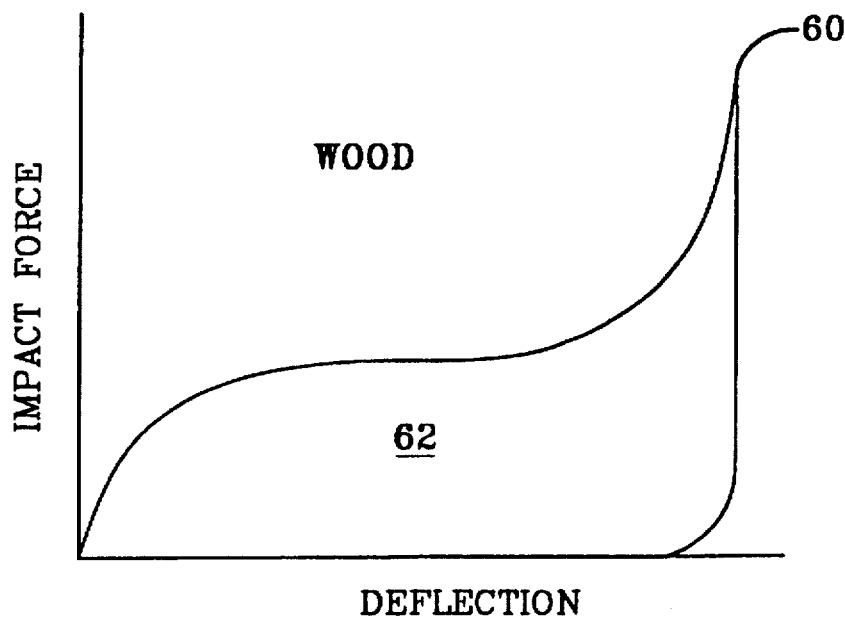

FIG. 4a is a graph illustrating the impact force versus deflection force of wood.

Figure 4B:
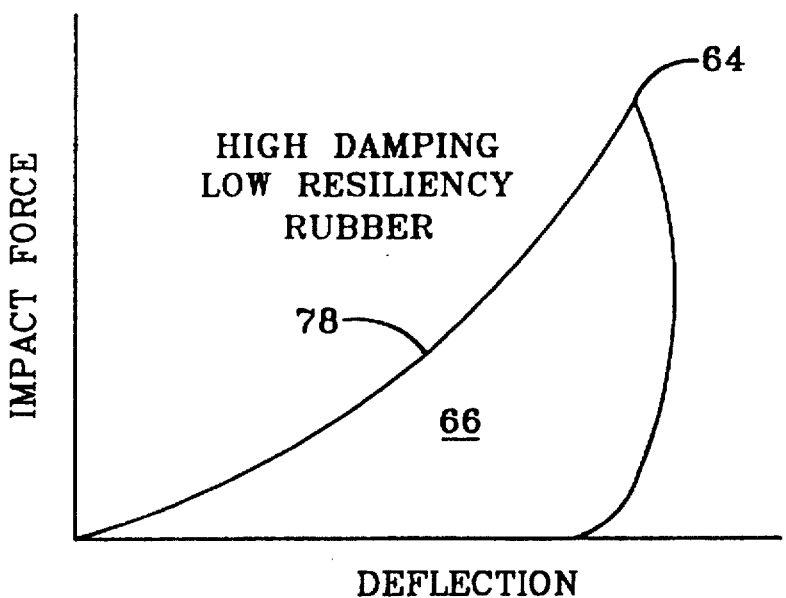

FIG. 4b is a graph illustrating the impact force versus deflection force of high damping, low resiliency rubber.

Figure 4C:
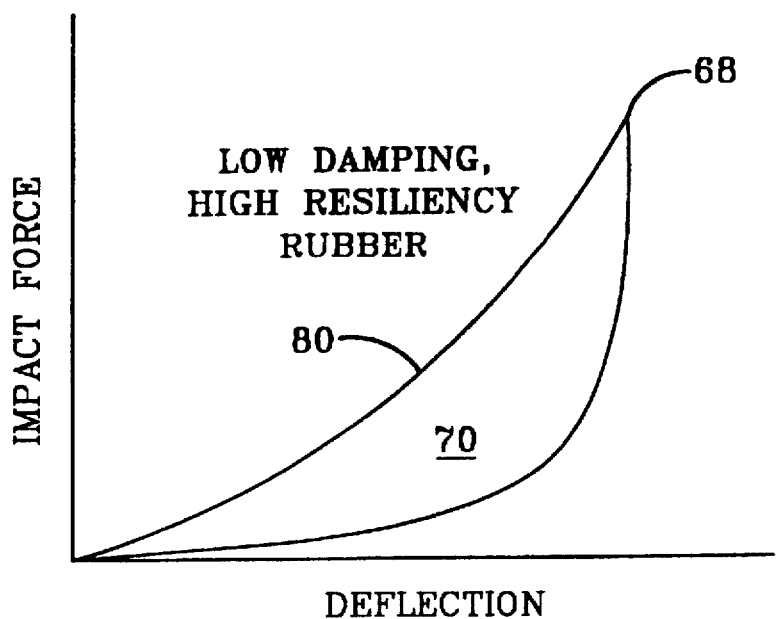

FIG. 4c is a graph illustrating the impact force versus deflection force of low damping, high resiliency rubber.

Figure 4D:
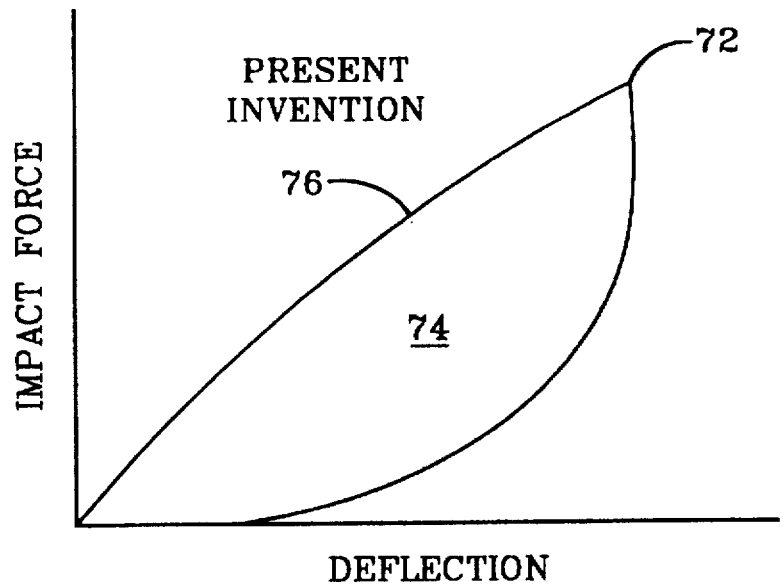

FIG. 4d is a graph illustrating the impact force versus deflection force of the elastomer and plastic alloy of the present invention.

Figure 5:
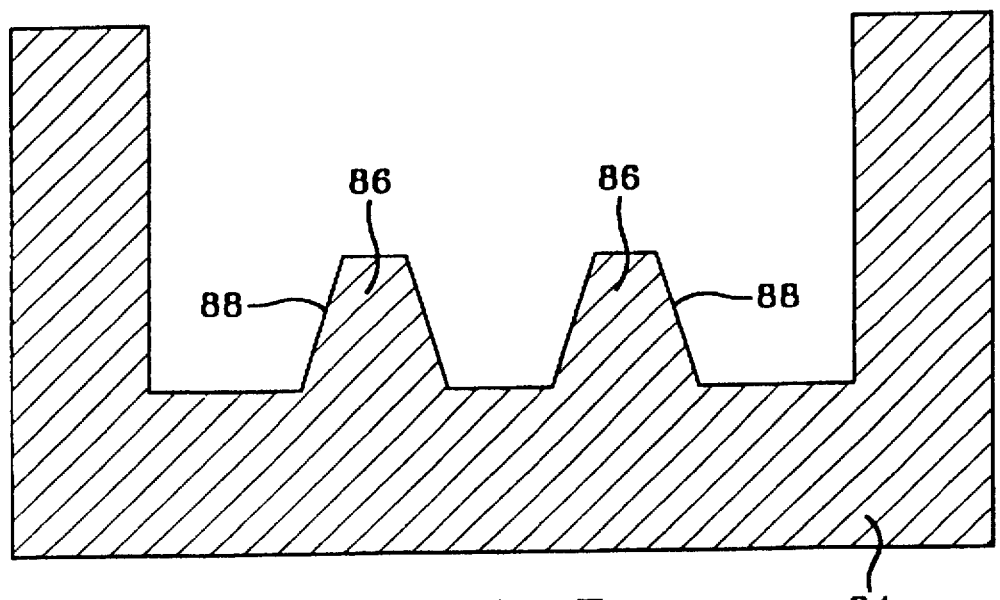

FIG. 5 is a schematic cross section taken through a prior art fender panel mold.

Figure 6:
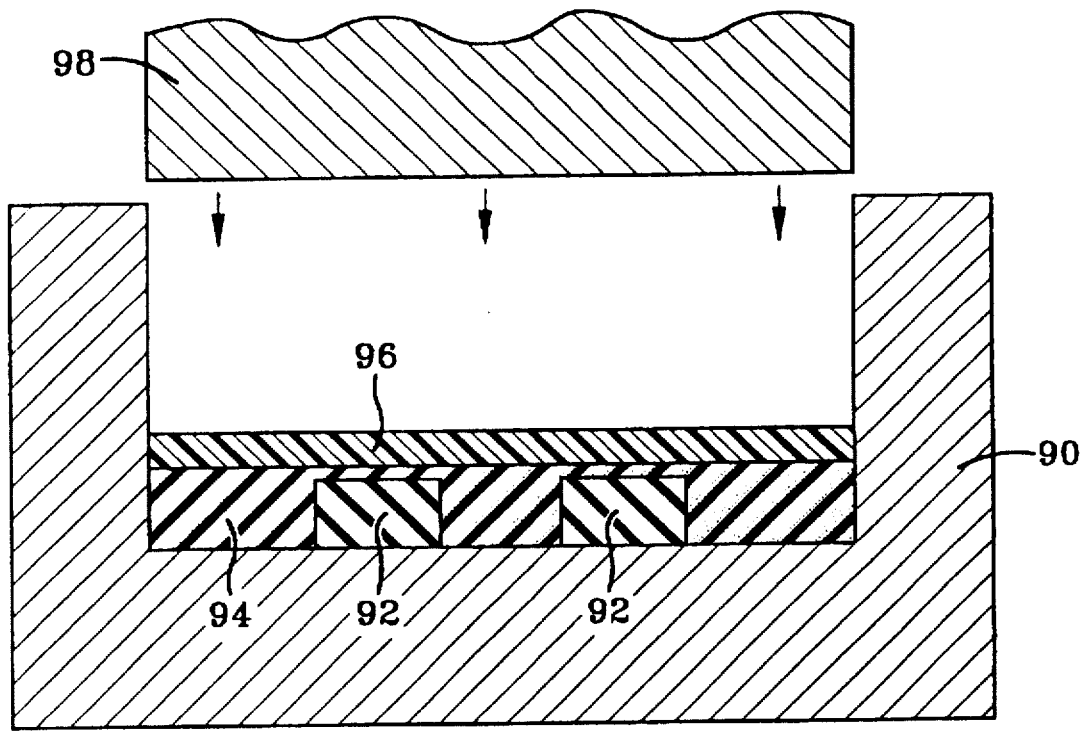

FIG. 6 is a schematic cross section taken through a mold in which the components of a fender panel embodying the concept of the present invention have been assembled prior to processing.

BEST MODE FOR CARRYING OUT THE INVENTION

Referring now to the drawings, wherein like reference numerals designate like or corresponding parts throughout the several views, there is shown in FIG. 1 a portion of a ship or larger vessel 10 whose hull is designated by the numeral 11. Such vessel 10 is a docking vessel with an open hull capable of lowering a door, not shown, to allow water into the hull to receive smaller vessels 12 such as landing craft, whereby the larger vessels may transport such smaller vessels for ferrying operations close to land.

Located above and below the water line as depicted in FIG. 1, there are a plurality of impact pads or fender protective structures 15 extending in a horizontal direction and suitably attached to the hull of the larger vessel 10. Each fender 15 is a composite member which includes a longitudinally extending, inwardly disposed (as viewed in the larger vessel 10) first layer of plastic material 16 and a resilient layer 17 attached thereto. The top layer 16 of the present invention may not be necessary in certain applications of the present fender protector of the present invention.

Referring now to FIG. 2, the resilient layer 17 has a plurality of rectangular bore holes 30 provided therethrough, for providing space to allow the material of layer 17 to bulge upon impact force being applied thereto. Layer 17 also has a plurality of circular mounting bore holes 35 provided therein for mounting of the pads. Nut and bolt connection assemblies 36 hold the pads in place. It is to be noted that holes 30, 35 may also be any of a number of other shapes no specifically shown herein. Holes 30 are preferably molded into layer 17.

Referring now to FIG. 3, the first layer or outermost layer 16 as viewed from inside the larger vessel 10 has an outer surface 20 and an inner surface 21. First layer 16 is a plastic, preferably a thermoplastic, and most preferably ultra high molecular weight polyethylene (UHMWPE) which has a melt flow index less than 0.15 measured in accordance with the test procedure of ASTM 1238-65T modified by an additional 3 kilogram load. UHMWPE is understood to be a polyolefine having an ultra high molecular weight which measured by the solution viscosity method is greater than 2.5 million. Polyolefine is understood to be a polymer or copolymer of one or more mono-olefines having no more than four carbon atoms, as well as mixtures of these polymers and/or copolymers, between themselves. It may also be a thermoplastic-rubber polymer alloy or blend comprised of UHMWPE and a low friction thermoset rubber compound. Such alloys are described in commonly owned U.S. Pat. No. 4,735,982, the disclosure of which is hereby fully incorporated herein by reference. It is to be noted that the alloy described in U.S. Pat. No. 4,735,982 can only be utilized for the top layer of the present invention. Alternatively, layer 16 maybe comprised of a compression molded flame retardant high impact strength UHMWPE composition as described in commonly owned U.S. Pat. No. 5,286,576 the disclosure of which is also hereby fully incorporated herein by reference. In the finished molded or densified form, this composition is comprised of 86 volume percent UHMWPE, a minimum of 4.40 volume percent of a flame retardant compound (10 pph based on UHMWPE for ammonium polyphosphate on a weight bases) in a minimum of 6 volume percent of chopped reinforcing fiber (19.0 pph based on UHMWPE for chopped fiberglass on a weight bases). In addition, the bulk volume of the chopped reinforcing fibers used in the above composition has measured by a tapped density test described herein must be at least about 27 volume percent of the finished compression molded volume of flame retardant high impact composition. The maximum volume loadings of the flame retardant compound and chopped reinforcing fibers are only limited by the minimum requirement of 7 ft-lb/inch width of notched izod impact strength, as long as both components are present above the minimum loadings described above.

The resilient layer 17 has an outer surface 22 that is in abutting contact with and bonded to the inner surface 21 of the first layer 16. To attach the fender structure 15 to the hull 11 of a vessel, the respective first and second layers have a plurality of mounting bores 35, extending in alignment with a narrower bore 34 extending into the hull 11. Bore 35 extends to approximately the middle to two thirds the thickness of the resilient layer, thereby defining a shoulder or bottom 38 to receive the flat base of a washer 39 and the head of a nut 40 secured to the threaded head of a bolt 41 that is suitably fastened to the hull 11. Such bores 35 are molded into the resilient layer 17 and the top layer 16 and extend about one half to two thirds of the way through such resilient layer leaving a space 27 that facilitates the attachment of the fender to the bulkhead or hull 11. Bore 34 is drilled through area 27 of layer 17 for receiving bolt 41. The open area of the bores of the resilient layer to the total layer thereof is on the order of 30% to 60%, thus permitting sufficient bulging of the resilient layer so that damage to the connection assemblies 36 is avoided.

A preferred thickness for use of the composite laminate structure as a fender protective device, the UHMWPE layer 16 is approximately 3.175 centimeters to 1.27 centimeters thick.

Although the preferred form of the present invention shows the first layer of UHMWPE as solid, it could be perforated or have bores, however, there is risk that a sharp projection on the impacting vessel could catch in the bores and rip the pad if the force exceeded the strength of either the first or second layers, or the bond between.

Heretofore, it was desirable to include a third layer between the elastomeric layer and the hull in order to provide rigid integrity to the composite laminate fender structure predominantly because prior elastomeric layers were too flexible. The present invention provides an improvement to prior fender structures as will be described in further detail hereinafter.

The preferred material for the resilient layer 17 of the present invention consists of an elastomer and plastic blend or alloy, preferably crumb natural rubber held together by a matrix of the thermoplastic UHMWPE. An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, SBR rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like. As noted before, however, natural rubber and other elastomers that have high elasticity are most preferred. Such elastomers have a shore A hardness of less than 65 before grinding. Of particular interest in the present invention is crumb rubber obtained by grinding used automotive or truck tires, because they are predominantly natural rubber and ground tire material is inexpensive. Fabric and steel wire particles originally in the tires should be removed.

Referring now to FIG. 4a, wherein an impact force versus deflection curve for wood is illustrated. It can be seen that force is applied up to a maximum point 60. When force is relaxed, the material is permanently set and does not recover. This curve illustrates that wood has high damping, low resiliency and very low recovery. The amount of energy absorption of the material is represented by the area 62 under the curve. It can be seen that wood has high energy absorption but is good for only one severe impact, after which it loses its favorable characteristics.

Referring now to FIG. 4b, wherein an impact force versus deflection curve for a high damping, low resiliency rubber is illustrated. It can be seen that force is applied up to a maximum point 64. When force is relaxed, the material is permanently set and does not recover. This curve is similar to the one for wood, meaning that the material has high damping, low resiliency, low recovery, and that it has high energy absorption (area 66) but is good for only one severe impact, after which it loses its favorable characteristics.

Referring now to FIG. 4c, wherein an impact force versus deflection curve for a low damping, high resiliency rubber is illustrated. It can be seen that force is applied up to a maximum point 64. When force is relaxed, the material returns reasonably close to its original shape, meaning the material has low permanent set. This material is therefore good for multiple severe impacts. Energy absorption (represented by hysteresis area 70) is, however, quite low, meaning that the material has high rebound and produces a slingshot effect, which is highly undesirable.

Referring now to FIG. 4d, wherein an impact force versus deflection curve for the elastomer and plastic alloy of the present invention is illustrated. It can be seen that force is applied up to a maximum point 72. When force is relaxed, the material returns close to its original shape, meaning the material has low permanent set. In addition, energy absorption is high, since hysteresis area 74 is large. It can be seen that a factor contributing to the high energy absorption is that the top curve 76 for the present invention is convex, whereas the top curves 78, 80 for the materials of FIGS. 4b and 4c, respectively, are concave. It is to be noted that the hysteresis area 74 is about twice as large as that of FIG. 4c.

FIG. 4d therefore illustrates that the elastomer plastic alloy of the present invention provides the favorable characteristics for a fender protective structure without the drawbacks of prior materials. That is, the present elastomer plastic alloy has high damping, low resiliency, low permanent set, and high energy absorption. The material is good for multiple severe impacts and does not give a sling shot effect.

As mentioned in the Background Art section, commonly owned U.S. Pat. No. 4,735,982 to Orndorff, Jr. teaches mixing a thermoset rubber compound and a thermoplastic for use as staves in journal bearings. Low friction is critical property in the Orndorff, Jr. application. The friction properties of the alloy of the present invention are not necessarily as important as high elasticity, low hardness and high energy absorption. However, highly elastic, soft elastomers with high energy absorption inherently have high friction properties. The low friction elastomers of U.S. Pat. No. 4,735,982 inherently have low elasticity, high hardness and low energy absorption. The teachings of Orndorff Jr. are therefore not compatible with the requirements of the present invention.

Manufacture of the fender protective structure of the present invention is as follows. For the elastomer used in the present alloy, a rubber compound is cured and, (in order to mix the two components), is ground to a suitable size to make a crumb rubber. Conventional grinding methods can be utilized, such as mechanical or cryogenic grinding. The crumb rubber is thoroughly dry mixed with a UHMWPE powder until a generally uniform random dispersion of the rubber is achieved. The particle size of rubber and UHMWPE preferably pass through a Tyler mesh screen below 35, with the 20 mesh particles being more preferable. Because of the free flowing nature of the UHMWPE, the rubber and UHMWPE powder mix very easily. The preferred ratio of constituents is on the order of 30% UHMWPE powder and 70% crumb rubber by weight. Thus a elastomer plastic mixture 94 is created.

Referring now to FIG. 5, heretofore molds 84 were provided for curing fender protective structures. Projections 86 were provided integrally therewith for displacing the rubber compound for creating expansion bores in the cured resilient layer. The projections 86 had to be treated with a mold release material and had to have tapered sides 88 in order to facilitate separation of the mold from the material after the curing cycle. The necessary tapers and large number of projections 86 unduly increased tooling costs for producing fender protective structures. Even with the tapered projections and mold release preparation, though, it is still difficult to separate the mold and finished product, resulting in increased manufacturing costs due to time and labor.

Referring now to FIG. 6, a mold 90, having the desired shape of the fender panels is provided. In accordance another aspect of the present invention, a plurality of cured rubber projections 92, (having the desired shape of the bores 30 in FIG. 2) are placed in the mold at the desired locations for the bores 30. The rubber and UHMWPE mix 94 is then poured into the mold body over the rubber blocks 92. The rubber and UHMWPE mix 94 is then covered with a layer 96 of UHMWPE powder. A mold cover 98 is then secured onto the mold body and sufficient pressure and heat are applied thereto to mold the elastomer and rubber together and melt the polyethylene powder. The heating temperature must be above the glass transition temperature (Tg) of the plastic. Desirable heating temperatures range from about 290° F. to about 360° F. and preferably between 310° and 350° F. After the melted polyethylene powder has: a) coalesced to form a top polyethylene layer 16; and b) sufficiently bonded the crumb rubber particles together, the mixture is cooled under pressure (at least 600 PSI and desirably more than 1000 PSI) to ambient temperature in order to prevent cracking or strain failure of the alloy. The mold is then opened, and the finished composite is removed. This procedure makes for a very even and high quality molded article because the flow distortions problematic of conventional thermoplastic compounds are eliminated.

It is to be noted that the rubber projections 92 are preferably made of the same elastomeric material as defined above for use in the elastomer plastic alloy, such as a nitrile rubber. The rubber projections 92 are easy to manufacture and inexpensive to make, regardless of the required shape. The coefficient of thermal expansion of the rubber projections is greater than that for the rubber plastic alloy and the rubber projections are more elastic than the alloy (after molding). These characteristics facilitate easy removal of the projections from the alloy after the fender protective structure is cooled. To this end, it has been found that the rubber projections "pop" out of the cured alloy when urged slightly. Sometimes the projections 92 simply fall out. It is now apparent that use of the removable rubber projections 92 reduces manufacturing costs of the fender protective structure of the present invention.

It is also to be noted that the present alloy shows no loss of adhesion to the top plastic layer or other plates. No adhesives or other special materials or procedures are needed to cause the top layer to bond to the resilient layer.

The preferred characteristics of the elastomer/plastic alloy of the present invention are a shore A hardness of 95, an elastic or Young's modulus in compression of on the order of 5,469 psi @ Bulge Ratio=0.381, and a specific gravity of 1.09 (30% UHMWPE mis). It has been discovered that the present elastomer and plastic alloy as a unique combination of high damping, low resiliency and high recovery not found in conventional materials utilized before.

Resiliency is defined as the percentage of impacting energy that is returned to the impacting object on the rebound (ASTM-D-2632). In the case of a fender protective structure, a low resilience percentage is desired in order to eliminate the possibility of sling shot or whiplash occurring to the occupants of impacting vessels. To this end, the present alloy has similar deflection values and similar resiliency percentages (23–25%) of prior elastomeric compounds used in fender protective structures. An advantage of the present alloy though, is that it returns within several minutes to very near its original thickness whereas former high damping elastomeric compounds exhibited considerable permanent set, because conventional elastomeric compounds having high damping (low resilience) invariably have high permanent set.

The present alloy permits a lower cost fender protective structure which because a third layer is unnecessary and the present alloy is less than half the cost of prior elastomeric compounds.

Energy absorption of the present invention is also maximized because of the greater thickness of the elastomer alloy layer compared with former three layer designs. The result is that the bolts/studs are better isolated from impact forces while reducing the complexity of the system. The bonded two layer design of the present invention also has a much larger circumferential area (for the rubber to bulge upward) between the washer OD and the hole ID then is the case with conventional three layer designs. This helps to better isolate the bolts from impact forces.

Although the invention has been shown and described with exemplary embodiments thereof, it should be understood by those skilled in the art that the foregoing and various other changes, omissions and additions may be made therein and thereto without departing from the spirit and scope of the invention.

I claim:

1. A fender protective structure for absorbing impact forces, said structure comprising a durable, hard plastic layer disposed over a resilient layer, said resilient layer comprising an alloy of elastomer and plastic; apertures extending partially into said resilient layer to define a plurality of chambers having a bottom located in said resilient layer; and connection means for holding the fender onto said structure by applying compressive force on said resilient layer between said bottom and said structure.

2. A fender protective structure according to claim 1, wherein said alloy is comprised of on the order of 30 percent ultra high molecular weight polyethylene (UHMWPE) and 70 percent rubber by weight.

3. A fender protective structure according to claim 1, wherein said alloy is comprised of UHMWPE and rubber.

4. A fender protective structure according to claim 1, wherein said alloy is comprised of crumb rubber and UHMWPEE.

5. A fender protective structure according to claim 1, wherein said plastic layer is comprised of UHMWPE.

6. A fender protective structure according to claim 1, wherein said alloy is comprised of more plastic than elastomer by weight.

7. A fender protective structure according to claim 1, wherein said resilient layer has voids provided therein for facilitating bulging of said elastomer and plastic alloy upon force being applied thereto.

8. A fender protective structure according to claim 1, wherein said alloy has a plurality of notches provided therein for relieving internal compressive forces due to bending of said alloy to thereby allow said alloy to conform to the shape of the curved structure.

9. A fender protective system for protecting a structure comprising:

a plurality of impact fenders comprising a top plastic layer disposed on a resilient layer, said resilient layer comprising an alloy of elastomer and plastic;

apertures extending partially into said resilient layer to define a plurality of chambers which facilitate the compression and bulging of said resilient layer, said chambers having a bottom defined located in said resilient layer; and, connection means for holding the fender onto the structure by applying compressive force on said resilient layer between said bottom and the structure.

10. A method of making a fender protective structure comprising the steps of:

dry mixing crumb elastomer and plastic powder together into an alloy mix;

providing a layer of plastic powder over said alloy mix; and, curing said plastic powder and said alloy mix to thereby make a plastic layer bonded to an alloy layer.

11. A method of making a fender protective structure according to claim 10, wherein said alloy is comprised of on the order of 30 percent ultra high molecular weight polyethylene and 70 percent rubber by weight.

12. A method of making a fender protective structure according to claim 10, wherein said alloy is comprised of UHMWPE and rubber.

13. A method of making a fender protective structure according to claim 10, wherein said alloy is comprised of more plastic than elastomer by weight.

14. A method of making a fender protective structure according to claim 10, wherein said curing step includes molding said voids into said alloy layer.

15. A method of making a fender protective structure according to claim 10, further comprising the step of cutting said voids into said alloy layer.

* * * * *